(12) United States Patent
Blomqvist

(10) Patent No.: US 7,325,451 B2
(45) Date of Patent: Feb. 5, 2008

(54) OSCILLATING MICRO-MECHANICAL SENSOR OF ANGULAR VELOCITY

(75) Inventor: Anssi Blomqvist, Vantaa (FI)

(73) Assignee: VTI Technologies Oy, Vantaa (FI)

( * ) Notice: Subject to any disclaimer, the term of this patent is extended or adjusted under 35 U.S.C. 154(b) by 0 days.

(21) Appl. No.: 11/318,435

(22) Filed: Dec. 28, 2005

(65) Prior Publication Data

US 2006/0156813 A1    Jul. 20, 2006

(30) Foreign Application Priority Data

Dec. 31, 2004   (FI)   ................................ 20041709

(51) Int. Cl.
*G01P 9/04* (2006.01)
*G01C 19/56* (2006.01)

(52) U.S. Cl. ................. 73/504.04; 73/504.12
(58) Field of Classification Search ............. 73/504.14, 73/504.12, 504.02, 504.04, 504.15
See application file for complete search history.

(56) References Cited

U.S. PATENT DOCUMENTS

| | | | |
|---|---|---|---|
| 5,600,065 A | 2/1997 | Kar et al. | |
| 5,831,162 A | 11/1998 | Sparks et al. | |
| 5,945,599 A | 8/1999 | Fujiyoshi et al. | |
| 6,294,400 B1 | 9/2001 | Stewart et al. | |
| 6,308,567 B1 | 10/2001 | Higuchi et al. | |
| 6,481,285 B1 | 11/2002 | Shkel et al. | |
| 6,619,121 B1 | 9/2003 | Stewart et al. | |
| 6,691,571 B2* | 2/2004 | Willig et al. | 73/504.12 |
| 6,892,575 B2* | 5/2005 | Nasiri et al. | 73/504.12 |
| 2003/0183007 A1 | 10/2003 | Willig et al. | |
| 2004/0074301 A1 | 4/2004 | Kuisma et al. | |
| 2004/0250620 A1 | 12/2004 | Nicu et al. | |

FOREIGN PATENT DOCUMENTS

| | | |
|---|---|---|
| EP | 1 335 187 A1 | 8/2003 |
| WO | WO 00/06971 | 2/2000 |
| WO | WO 2005/043079 A2 | 5/2005 |

* cited by examiner

*Primary Examiner*—Helen Kwok
(74) *Attorney, Agent, or Firm*—Squire, Sanders & Dempsey L.L.P.

(57) ABSTRACT

The present invention relates to measuring devices used in measuring angular velocity and, more specifically, to oscillating micro-mechanical sensors of angular velocity. In the sensors of angular velocity according to the present invention, at least one pair of electrodes is provided in association with an edge of a seismic mass (1), (9), (10), (20), (30), (31), which pair of electrodes together with the surface of the mass (1), (9), (10), (20), (30), (31) form two capacitances such, that one of the capacitances of the pair of electrodes will increase and the other capacitance of the pair of electrodes will decrease as a function of the angle of rotation in the primary motion of the mass (1), (9), (10), (20), (30), (31). The structure of a sensor of angular velocity according to the present invention enables reliable and efficient measuring particularly in solutions for compact oscillating micro-mechanical sensors of angular velocity.

11 Claims, 3 Drawing Sheets

OSCILLATING MICRO-MECHANICAL SENSOR OF ANGULAR VELOCITY

FIELD OF THE INVENTION

The invention relates to measuring devices for use in measuring angular velocity and, more specifically, to oscillating micro-mechanical sensors of angular velocity. The invention aims at providing an improved sensor structure enabling reliable and efficient measuring, particularly in compact oscillating micro-mechanical angular velocity sensor solutions.

BACKGROUND OF THE INVENTION

Measuring based on an oscillating sensor of angular velocity has proved to have a simple principle and to provide a reliable way of measuring angular velocity. A certain known primary motion is being generated and maintained in the oscillating sensor of angular velocity. The movement, which the sensor is designed to measure, is detected as a deviation of the primary motion.

An external angular velocity affecting the sensor in a direction perpendicular to the direction of motion of the resonators induces a Coriolis force on the seismic mass perpendicular to its direction of motion. The Coriolis force being proportional to the angular velocity is detected from the oscillation of the mass in, for instance, a capacitive manner.

The biggest problem concerning micro-mechanical oscillating sensors of angular velocity is the so called quadrature signal, which is caused by poor dimensional accuracy of the structures. Resonators manufactured in the methods of micro-mechanics may have faulty tolerance in the orthogonality of their directions of motion, which gives rise to a signal, called a quadrature signal, which, at worst, is even hundreds of times the strength of the full scale indication of the angular velocity signal.

The angular velocity signal to be measured, the signal being proportional to the speed of the mass, is luckily at a 90 degree phase shift in relation to the quadrature signal, and thus the quadrature signal will disappear in an ideal demodulation. Since it is considerably much larger than the signal to be measured, it limits, however, the dynamics of the signal. In addition, the biggest disadvantage of the quadrature signal is the fact that it, due to phase shifts of the electronic signals, unless compensated, impairs the stability of the null point of the sensor.

Sensors of angular velocity according to prior art have also been designed, wherein attempts have been made to compensate the quadrature signal. One such quadrature signal compensation solution for a sensor of angular velocity according to prior art is the, so called, feed-forward compensation, wherein a force modulated by the detected primary motion is being fed into the detecting resonator in opposite phase in relation to the quadrature signal. This way of compensation is not very useful, since it merely shifts the stringent phase stability requirements of the electronics from the demodulation to the compensation block.

The oscillating structure can also be bent by static forces, and then the phase stability requirement of the electronics is essentially reduced. Among others, U.S. Pat. No. 6,370,937 describes such a solution for a sensor of angular velocity according to prior art. In the solution for a sensor of angular velocity described in the U.S. patent, the inclination of an electrostatic torsion resonator can be adjusted by means of an electrostatic force.

Another method according to prior art, more feasible than the previous one, for compensating the quadrature signal of a sensor of angular velocity, consists of generating, by means of a static quantity, a force modulated by the motion, which force compensates the quadrature signal caused by a residue in the spring force. A compensation method like this is superior to statically twisting the structure, since it allows mechanical structures of considerably higher stiffness. As the compensating force in such a solution always is in phase with the motion, it puts no additional demands on the phase control of the electronics.

U.S. Pat. No. 5,866,816 describes a solution for a sensor of angular velocity according to prior art. In the solution for a sensor of angular velocity described in the U.S. patent, the quadrature signal of a piezoelectric bar resonator can be compensated by means of piezoelectric forces by using a static bias voltage. Also an electrostatic force can work in the described manner, provided that electric field, asymmetric in the direction of the motion, can be provided.

Electrostatic compensation of the quadrature signal can be considered prior art in connection with linearly oscillating comb resonators. U.S. Pat. No. 5,992,233 describes a prior art solution for a sensor of angular velocity. In the solution for a sensor of angular velocity described in the U.S. patent, the electrode combs, parallel to the direction of the motion, are biased in such a way, that a motion of the resonator sideways in relation to the comb structure (direction Y in the U.S. patent) changes the area of the capacitor plates of the comb structure, which generates a linear, amplitude dependent force in the orthogonal direction (direction X in the U.S. patent).

One of the greatest advantages of the electrostatic quadrature compensation is that, by means of electronics, it can be made adaptive. U.S. Pat. No. 5,672,949 describes a solution for a sensor of angular velocity according to prior art. In the U.S. patent, the changes in the quadrature signal caused by mechanical twisting, aging, or various temperature dependencies continuously can be compensated based on the sensor's detection signal.

The structures according to prior art described above are not, however, suitable for application in sensors of angular velocity, wherein the primary motion is one of rotary oscillation. This kind of structure is particularly suitable in solutions requiring good resistance to vibration and impact.

An object of the invention is, in fact, the provision of a structure of an oscillating sensor of angular velocity, wherein electrostatic compensation of the quadrature signal is implemented such that it is particularly well suited for micro-mechanical rotary oscillating sensors of angular velocity, in comparison with prior art solutions.

SUMMARY OF THE INVENTION

The object of the invention is to provide such an improved oscillating sensor of angular velocity, enabling reliable and efficient measuring particularly in compact oscillating solutions for sensors of angular velocity, and in which an electrostatic quadrature signal compensation is implemented, that is particularly well suited for micro-mechanical rotary oscillating sensors of angular velocity, in comparison with prior art solutions.

According to the invention, an oscillating micro-mechanical sensor of angular velocity is provided, comprising at least one seismic mass and an associated movable electrode, which is attached to the sensor component body at support areas such, that in the sensor of angular velocity, the primary motion, which has to be generated, is an angular oscillation of at least one seismic mass and an associated movable electrode about an axis perpendicular to the plane of the disk formed by the masses, the seismic mass has a second degree of freedom, in addition to the primary motion, in relation to an axis of detection perpendicular to the primary motion, and that at one edge, at least, of the seismic mass, at least one pair of electrodes is provided, which pair of electrodes, together with the surface of the mass, form two capacitances in such a way, that one capacitance of the pair of electrodes will increase as a function of the angle of rotation of the primary motion of the mass, and the second capacitance of the pair of electrodes will decrease.

Preferably, the electrodes of the pair of electrodes are positioned equidistant on both sides of the axis of detection. Preferably, both electrodes of the pair of electrodes are connected to a voltage of equal magnitude in relation to the potential of the mass.

Preferably, the sensor of angular velocity comprises a seismic mass and an associated movable electrode, which mass is attached to the body of the sensor component by means of an attachment spot, bending springs for the primary motion connecting the attachment spot to a surrounding stiff auxiliary structure and essentially restricting the primary motion of the mass to an angular oscillation about an axis perpendicular to the plane of the disk, and torsion springs for the detection motion conveying the primary motion to the seismic mass and simultaneously giving the mass a second degree of freedom for the detection motion, which constitutes a rotary oscillation about a detection axis perpendicular to the axis of the primary motion.

Alternatively, the sensor of angular velocity comprises two seismic masses and associated movable electrodes attached to the body of the sensor component by means of two attachment spots, bending springs for the primary motion connecting the attachment spots to surrounding stiff auxiliary structures, or directly to the seismic masses, torsion springs for the detection motion, and a bending spring connecting the seismic masses to each other, the resonators being connected in such a way, that both the primary motion of the masses and the detection motion constitute a motion in opposite phases of the two movable electrodes.

Preferably, the oscillation caused by the external angular velocity is detected in a capacitive manner by means of electrodes positioned above or below the masses. Further, preferably, the electrodes are grown onto the inner surface of the wafer hermetically closing the sensor structure.

Preferably, the sensor of angular velocity is a sensor of angular velocity measuring angular velocity in relation to two axes, the sensor comprising a seismic mass and an associated movable electrode, the mass being attached to the sensor component body by means of an attachment spot, bending springs for the primary motion, connecting the attachment spot to a surrounding stiff auxiliary structure and essentially restricting the primary motion of the mass to an angular oscillation about an axis perpendicular to the plane of the disk, torsion springs for the detection motion in a first direction, conveying the primary motion to the seismic mass and simultaneously giving the mass a degree of freedom for the detection motion in the first direction, which detection motion constitutes a rotary oscillation about a first detection axis essentially perpendicular to the axis of the primary motion, and torsion springs for the detection motion in a second direction, conveying the primary motion to the seismic mass and simultaneously giving the mass a degree of freedom for the detection motion in the second direction, which detection motion constitutes a rotary oscillation about a second detection axis essentially perpendicular to the axis of the primary motion and to the first detection axis.

Alternatively, the sensor of angular velocity is a sensor of angular velocity measuring angular velocity about two axes, the sensor comprising two seismic masses and associated movable electrodes attached to the body of sensor component by means of two attachment spots, bending springs for the primary motion, connecting the attachment spots to surrounding stiff auxiliary structures, torsion springs for the detection motion in a first direction, conveying the primary motion to the seismic mass and simultaneously giving the mass a degree of freedom for the detection motion in the first direction, torsion springs for the detection motion in a second direction, conveying the primary motion to the seismic mass and simultaneously giving the mass a degree of freedom for the detection motion in the second direction, and a bending spring connecting the seismic masses to each other.

Preferably, the attachment spots are joined in an anodic manner to the wafer hermetically closing the sensor structure. Alternatively, the attachment spots are joined by means of a fusion joint to the wafer hermetically closing the sensor structure.

BRIEF DESCRIPTION OF THE DRAWINGS

Below, the invention and its preferable embodiments are described in detail with exemplifying reference to the attached pictures, in which.

DETAILED DESCRIPTION OF THE INVENTION

In the oscillating sensor of angular velocity according to the present invention, the primary motion, which has to be generated, is a rotary oscillation of at least one seismic mass and an associated movable electrode about an axis perpendicular to the plane of the disk. In addition to the primary motion, the seismic mass possesses a second degree of freedom in relation to a detection axis perpendicular to the primary motion.

At least one pair of electrodes is provided underneath or above at least one edge of the seismic mass, which pair of electrodes, together with the surface of the mass, form two capacitances. These capacitances vary as a function of the angle of rotation in the primary motion, positively in one of the electrodes, negatively in the other. The electrodes of the pair can be positioned equidistant on each side of the detection axis. A voltage of equal magnitude in relation to the potential of the mass can be applied to both electrodes of the pair, accomplishing a net moment varying in phase with the primary motion, while the static moment cancels out.

Figure 1:
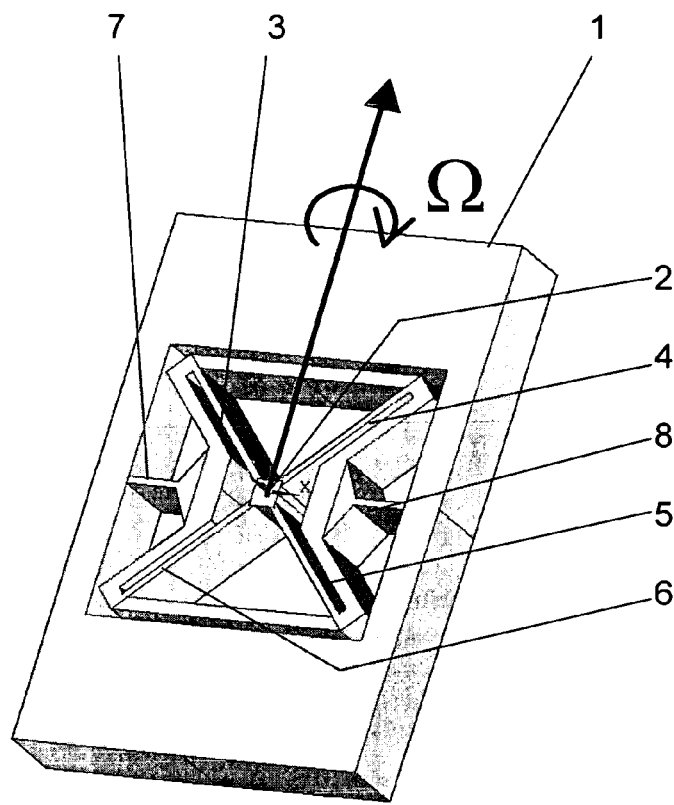
FIG. 1 shows a perspective depiction of the structure of the seismic mass and the movable electrode of an oscillating sensor of angular velocity according to the present invention.

FIG. 1 shows a perspective depiction of the structure of the seismic mass and the associated movable electrode of an oscillating sensor of angular velocity according to the present invention. The structure of the sensor of angular velocity according to the present invention comprises a seismic mass and an associated movable electrode 1 attached to the body of the sensor component at an attachment spot 2. The movable electrode 1 can, for example, be the conductive surface of the mass or a conductor grown onto the same. The sensor of angular velocity according to the present invention further comprises bending springs 3-6 for the primary motion and torsion springs 7-8 for the detection motion. In the picture, the axis sensitive for the angular velocity is denoted $\Omega$.

When the structure according to the invention, depicted in FIG. 1, oscillating about the axis Z, is being turned about the axis Y, part of the primary motion of the mass is linked into a rotary oscillation about the detection axis (X), due to conservation of the moment of momentum. The amplitude of this oscillation is directly proportional to the angular velocity $\Omega$ of the turning.

The moving parts 1, 3-8 of the sensor of angular velocity can be patterned into a silicon wafer, the sensor structure being hermetically closed by a wafer attached on its top or bottom side. There is an attachment spot 2 at the central area of the sensor structure, which spot is fastened at the wafer on the top or bottom side.

The attachment spot 2 is connected by two or more bending springs 3-6 to a stiff auxiliary structure surrounding the spot, which springs restrict the primary motion into essentially an angular oscillation about an axis perpendicular to the plane of the disk. Two torsion springs 7-8 convey the primary motion to the seismic mass 1 and, at the same time, give the mass 1 a second degree of freedom for the detection motion, which is a rotary oscillation about the axis X.

Figure 2:
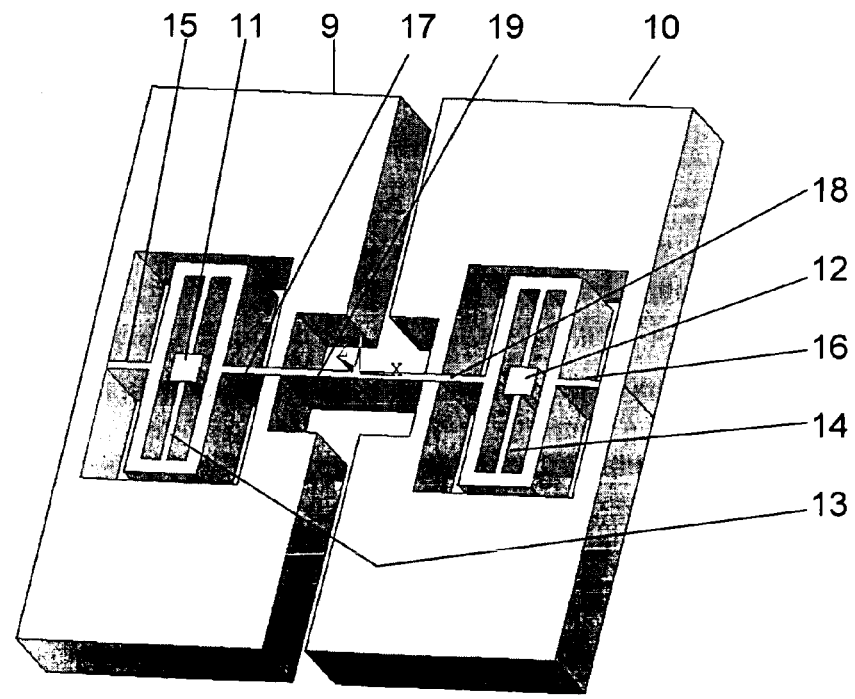
FIG. 2 shows a perspective depiction of an alternative structure of the seismic masses and the associated movable electrodes of an oscillating sensor of angular velocity according to the present invention.

FIG. 2 shows a perspective depiction of an alternative structure of the seismic masses and the associated movable electrodes of an oscillating sensor of angular velocity according to the present invention. The alternative structure of the sensor of angular velocity according to the present invention comprises two seismic masses and associated movable electrodes 9, 10 attached to the body of the sensor component at two attachment spots 11, 12. The attachment spots 11, 12 at the center of the masses 9, 10 may be joined to the wafer, which hermetically closes the sensor structure, in, for example, an anodic manner or by fusion joining. The sensor of angular velocity according to the present invention further comprises bending springs 13, 14 for the primary motion, torsion springs 15-18 for the detection motion, and a bending spring 19 connecting the two seismic masses 9, 10 to each other.

The operating principle of the alternative sensor of angular velocity according to the present invention, depicted in FIG. 2, differs from the one described above, in that both the primary motion and the detection motion, due to the coupling of the resonators, are opposite phase motions of the two movable electrodes 9, 10.

Figure 3:
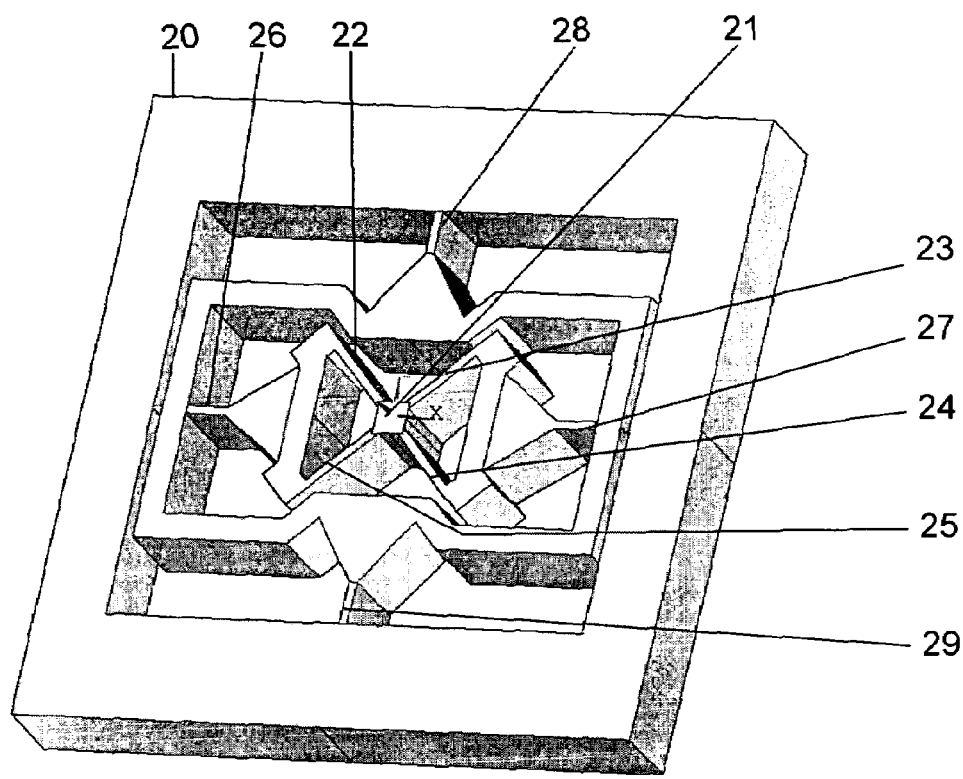
FIG. 3 shows a perspective depiction of the structure of the seismic mass and the associated movable electrode of an oscillating sensor of angular velocity with two axes according to the present invention.

FIG. 3 shows a perspective depiction of the structure of the seismic mass and the associated movable electrode of an oscillating sensor of angular velocity with two axes according to the present invention. The structure of the sensor of angular velocity with two axes according to the present invention comprises a seismic mass and an associated movable electrode 20 attached to the body of the sensor component at an attachment spot 21. The sensor of angular velocity according to the invention further comprises bending springs 22-25 for the primary motion, torsion springs 26-27 for the detection motion in a first direction and torsion springs 28-29 for the detection motion in a second direction.

Figure 4:
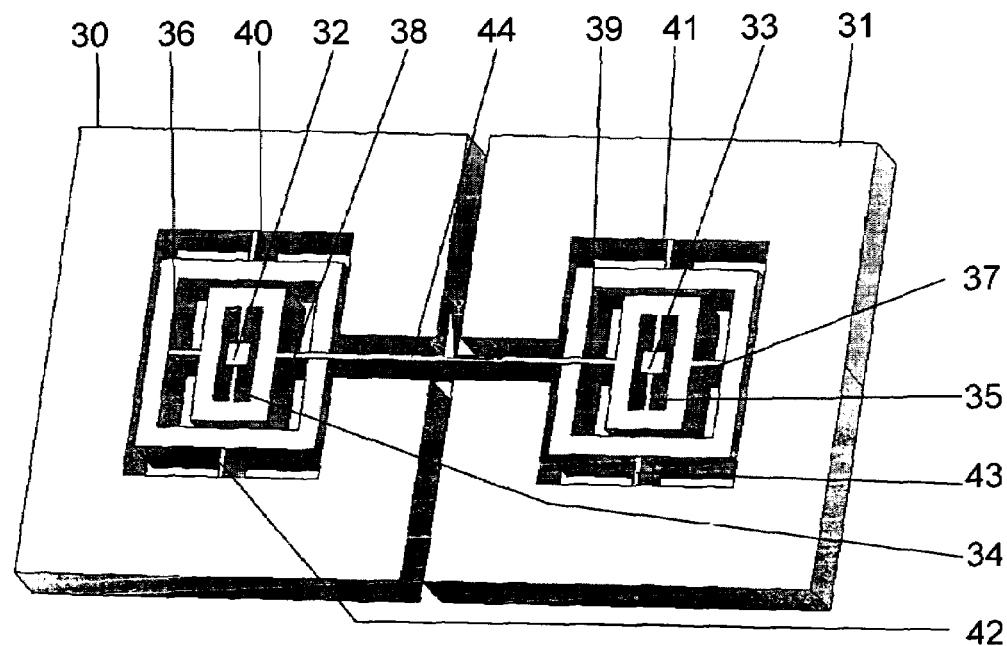
FIG. 4 shows a perspective depiction of an alternative structure of the seismic masses and the associated movable electrodes of an oscillating sensor of angular velocity with two axes according to the present invention.

FIG. 4 shows a perspective depiction of an alternative structure of the seismic masses of an oscillating sensor of angular velocity with two axes according to the present invention and of the associated movable electrodes. The structure of the sensor of angular velocity measuring angular velocity in relation to two axes according to the present invention comprises two seismic masses and associated movable electrodes 30, 31 attached to the body of the sensor component at two attachment spots 32, 33. The sensor of angular velocity according to the invention further comprises bending springs 22-25 for the primary motion, torsion springs 26-27 for the detection motion in a first direction, and torsion springs 28-29 for the detection motion in a second direction.

FIG. 4 shows a perspective depiction of an alternative structure of the seismic masses and the associated movable electrodes of an oscillating sensor of angular velocity with two axes according to the present invention. The sensor of angular velocity with two axes according to the present invention comprises two seismic masses and associated movable electrodes 30, 31 attached to the body of the sensor component at two attachment spots 32, 33. The oscillating sensor of angular velocity with two axes according to the present invention further comprises bending springs 34, 35 for the primary motion, torsion springs 36-39 for the detection motion in a first direction, torsion springs 40-43 for the detection motion in a second direction, and a bending spring 44 connecting the seismic masses 30, 31 to each other.

In the structure of the oscillating sensor of angular velocity with two axes according to the present invention, there are, compared with the structure with one axis described above, additional stiff auxiliary structures with suspension in relation to the masses 30, 31 by means of pairs of torsion springs 40-43 extending in the direction of the axis Y. The structure of the sensor of angular velocity with two axes according to the present invention provides the seismic masses 30, 31 with a second degree of freedom perpendicular to the primary motion, which enables the sensor to operate as a sensor of angular velocity with two axes utilizing the same primary motion.

The solution for electrostatically compensating the quadrature signal of the sensor of angular velocity according to the present invention can be used, for example, for compensating the quadrature signal in all of the types of structures described above. The invention can also be used for compensating quadrature signals in other such structures of sensors of angular velocity, wherein the primary motion constitutes a rotary oscillation about an axis perpendicular to the plane of the disk.

Figure 5:
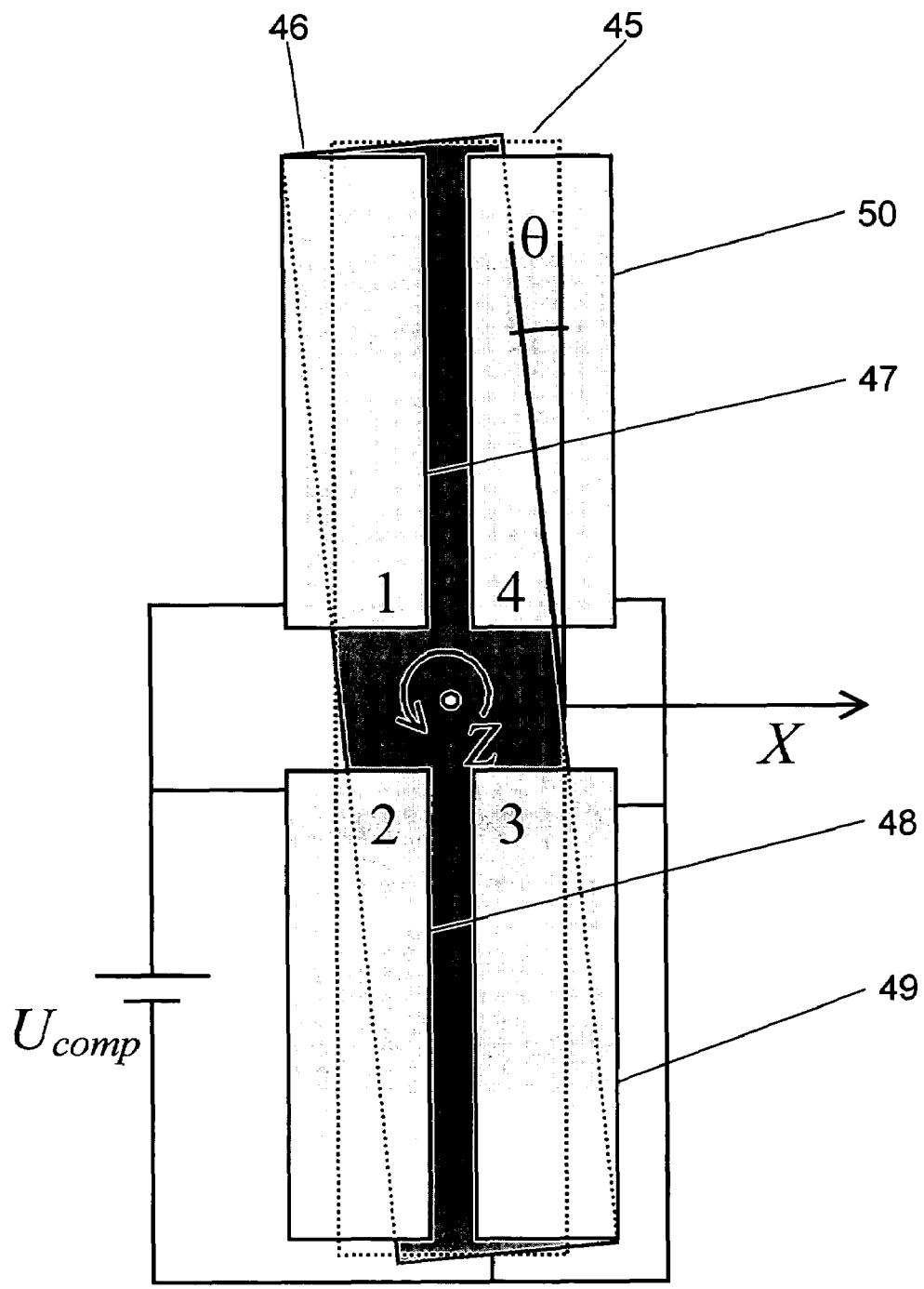
FIG. 5 shows a simplified depiction of the compensation principle according to the present invention.

FIG. 5 shows a simplified depiction of the compensation principle according to the present invention. The structure according to the present invention, shown in the Figure, comprises a seismic mass and an associated movable electrode 45, 46 and stationary electrodes 47-50 installed above or underneath the movable electrode 45, 46.

In the solution according to the present invention, electrodes for detecting angular velocity, such as the stationary electrodes 47-50, are positioned at the area of the mass 45, 46, which possesses two rotary degrees of freedom, i.e. a first one (z) in the direction of the primary motion and a second one (x) in the direction of the detection motion.

In the solution according to the present invention the movable electrodes can, for example, be implemented by means of the edge of the mass 45, 46, the stationary electrodes extending beyond the edge. Thus, the same edge of the mass bisects the stationary electrodes of both pairs of electrodes 47, 48 and 49, 50.

As the mass rotates 45, 46, the angle of rotation θ of the primary motion in relation to the stationary electrodes changes the area of the plates of the planar capacitors as indicated in FIG. 5. At a positive angle of rotation, the area of the electrode 47 at the left edge increases, while simultaneously the area of the electrode 48, at the same edge, decreases in proportion to the angle of rotation θ.

In compensating, the electrodes to the left in FIG. 5, 47 and 48, are biased to a static voltage $U_{comp}$ in relation to the electrodes to the right, 49 and 50, and to the mass 45, 46 connected to that same potential. Thus, the change in capacitor plate area due to the angle of rotation causes a proportional change in the electrostatic force between the biased electrodes 47 and 48 and the mass 45, 46 connected to the ground potential.

For both electrodes, the change in the electrostatic force is proportional to the angle of rotation θ, for the electrode 47, however, it is positive, and for the electrode 48, it is negative. These changes of the force in opposite directions generate changes in equal directions to the momentum in relation to the detection axis X. The static momentum induced by the voltage $U_{comp}$, however, is cancelled out, contrary to the electrostatic principle of quadrature compensation at linear motion.

The momentum, being linearly dependent of the angle of rotation θ of the primary motion, causes a change proportional to the square of the compensation voltage $U_{comp}$, which, having the correct polarity and magnitude, compensates the quadrature signal.

By connecting the electrodes 47 and 48 to the potential of the mass 45, 46 and, correspondingly, the electrodes 49 and 50 to the voltage $U_{comp}$, the direction of the compensating moment can be reversed.

The solution according to the present invention can be used for compensating the quadrature signal in all such sensors of angular velocity, where the primary motion is an angular oscillation in relation to the axis Z, and electrodes can be arranged above or underneath the mass at a distance of a suitable gap. The electrodes can, for example, be grown and patterned onto the inner surface of the wafer hermetically closing the sensor structure.

The invention claimed is:

1. An oscillating, micro-mechanical sensor of angular velocity, said sensor comprising at least one seismic mass (1), (9), (10), (20), (30), (31), (45), (46) and associated movable electrode attached to a body of the sensor component at support areas such, that
    in the sensor of angular velocity, a primary motion, which has to be generated, is an angular oscillation of the at least one seismic mass (1), (9), (10), (20), (30), (31), (45), (46) and the associated movable electrode about an axis perpendicular to the plane of the disk formed by the masses,
    in addition to the primary motion, the seismic mass (1), (9), (10), (20), (30), (31), (45), (46) possesses a second degree of freedom in relation to a detection axis perpendicular to the primary motion, and that
    in association with at least one edge of the seismic mass (1), (9), (10), (20), (30), (31), (45), (46), at least one pair of electrodes is provided, which the pair of electrodes together with the surface of the mass (1), (9), (10), (20), (30), (31), (45), (46) forms two capacitances such, that, as a function of an angle of rotation of the primary motion of the mass (1), (9), (10), (20), (30), (31), (45), (46), the capacitance of one pair of electrodes will increase and the capacitance of the other pair of electrodes will decrease.

2. Sensor of angular velocity according to claim 1, wherein the electrodes of the pair of electrodes are positioned equidistant on both sides of a detection axis.

3. Sensor of angular velocity according to claim 1, wherein a voltage of the same magnitude in relation to the potential of the mass (1), (9), (10), (20), (30), (31), (45), (46) is connected to both electrodes of the pair of electrodes.

4. Sensor of angular velocity according to claim 1, wherein the sensor further comprises:
    a seismic mass and an associated movable electrode (1), which is attached to a body of a sensor component at an attachment spot (2),
    bending springs (3)-(6) for the primary motion, connecting the attachment spot (2) to a surrounding stiff auxiliary structure and restricting the primary motion of the mass (1) essentially to an angular oscillation about the axis perpendicular to the plane of the disk, and
    torsion springs (7), (8) for a detection motion, conveying the primary motion to the seismic mass (1) and simultaneously giving the mass (1) a second degree of freedom for the detection motion, which the detection motion is a rotary oscillation about a detection axis perpendicular to the axis of the primary motion.

5. Sensor of angular velocity according to claim 1, wherein the sensor further comprises:
    two seismic masses (9), (10) and associated movable electrodes (9), (10), attached to a body of a sensor component at two attachment spots (11), (12),
    bending springs (13), (14) for the primary motion connecting the attachment spots (11), (12) to surrounding stiff auxiliary structures or directly to the seismic masses (9), (10),
    torsion springs (15)-(18) for the detection motion, and
    a bending spring (19) connecting the seismic masses (9), (10) to each other, such that the resonators are connected in such a way, that both the primary motion of the masses (9), (10) and a detection motion are opposite phase motions of the two movable electrodes (9), (10).

6. Sensor of angular velocity according to claim 4, wherein the oscillation caused by an external angular velocity is detected capacitively by means of electrodes located above or underneath the seismic masses (1), (9), (10).

7. Sensor of angular velocity according to claim 6, wherein the electrodes located above or underneath the seismic masses are grown onto an inner surface of a wafer hermetically closing the sensor structure.

8. Sensor of angular velocity according to claim 1, wherein the sensor of angular velocity is a sensor of angular velocity measuring angular velocity in relation to two axes, the sensor comprising

- a seismic mass and an associated movable electrode (20) attached to a body of the sensor component at an attachment spot (21),
- bending springs (22)-(25) for the primary motion, connecting the attachment spot (21) to a surrounding stiff auxiliary structure and restricting the primary motion of the mass (20) essentially to an angular oscillation about the axis perpendicular to the plane of a disk,
- torsion springs (26), (27) for a detection motion in a first direction conveying the primary motion to the seismic mass (20) and simultaneously giving the mass (20) a degree of freedom for the detection motion in the first direction, which the detection motion is a rotary oscillation essentially about a first detection axis perpendicular to the axis of the primary motion, and
- torsion springs (28), (29) for a detection motion in a second direction conveying the primary motion to the seismic mass (20) and simultaneously giving the mass (20) a degree of freedom for the detection motion in the second direction, which the detection motion is a rotary oscillation essentially about a second detection axis perpendicular to the axis of the primary motion and to the first detection axis.

9. Sensor of angular velocity according to claim 1, wherein the sensor of angular velocity is a sensor of angular velocity measuring angular velocity in relation to two axes, the sensor comprising

- two seismic masses and associated movable electrodes (30), (31) attached to a body of a sensor component at two attachment spots (32), (33),
- bending springs (34), (35) for the primary motion connecting the attachment spots (32), (33) to surrounding stiff auxiliary structures,
- torsion springs (36)-(39) for a detection motion in a first direction, conveying the primary motion to the seismic masses (30), (31) and simultaneously giving the masses (30), (31) a degree of freedom for the detection motion in the first direction,
- torsion springs (40)-(43) for a detection motion in a second direction, conveying the primary motion to the seismic masses (30), (31) and simultaneously giving the masses mass (30), (31) a degree of freedom for the detection motion in the second direction, and
- a bending spring (44) connecting the seismic masses (30), (31) to each other.

10. Sensor of angular velocity according to claim 4, wherein attachment spots (2), (11), (12), (21), (32), (33) are joined in an anodic manner to the wafer hermetically closing a sensor structure.

11. Sensor of angular velocity according to claim 4, wherein attachment spots (2), (11), (12), (21), (32), (33) are joined by means of a fusion joint to the wafer hermetically closing a sensor structure.

* * * * *